Nov. 27, 1962 G. D. KELLER 3,065,635
LONG TRAVEL MAGNETIC FOLLOWER DEVICE
Filed April 1, 1959
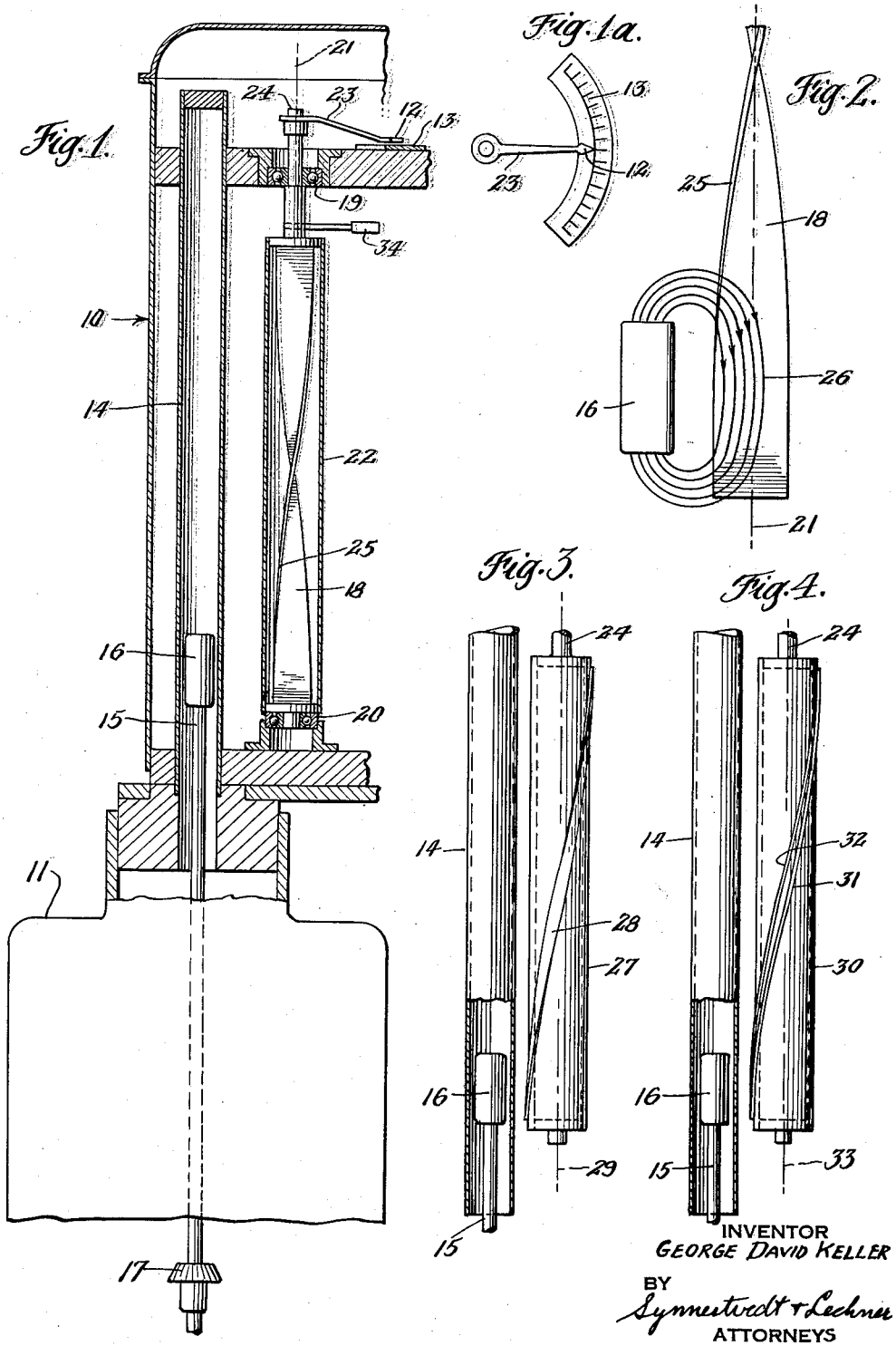
INVENTOR
GEORGE DAVID KELLER
BY
Synnestvedt + Lechner
ATTORNEYS United States Patent Office 3,065,635
Patented Nov. 27, 1962

3,065,635
LONG TRAVEL MAGNETIC FOLLOWER DEVICE
George D. Keller, Wyncote, Pa., assignor to Brooks Instrument Company, Inc., a corporation of Pennsylvania
Filed Apr. 1, 1959, Ser. No. 803,428
9 Claims. (Cl. 73—319)

This invention generally relates to devices for determining the condition of a fluid within a fluid-tight container and transmitting this information outside of the container, and more particularly to such devices employing magnetic coupling means.

One manner of determining the condition of a fluid within a sealed container and transmitting this information outside thereof is by employing magnet and magnetic follower elements with one element being located inside the container and being positionable with variations in the fluid and the other located outside and being magnetically coupled thereto to follow and indicate these movements. In any such coupling it is usually essential that the follower always maintain positive engagement with the driver and accurately and reliably reach a coincident position with the driver despite rapid changes in the driver position. It is also quite desirable that the follower remain operatively coupled over a wide range of travel. Additionally, in any fluid measuring system, the mechanism must be rugged for dependable operation and easily disassembled for servicing and cleaning, yet not require constant attention and servicing as would be needed if the mechanism were of such nature as to become frequently fouled or clogged by scaling or other contamination as is likely to be deposited by different fluids.

To provide a device having this combination of essential and desirable features in accordance with the present invention, there is provided an improved magnetic coupling in which the elements are both positioned and movable about parallel axes and coupled by an elongated magnetic field that is also substantially parallel to said axes and movable in a direction along said axes. By this arrangement of the elements, the present invention not only provides the essential accuracy and reliability over wide ranges of travel but does so while eliminating the need for elaborately configured driver and follower elements, fluid seals, spring balancing means and other expedients so commonly relied upon by prior art magnetic couplings.

It is accordingly one object of the present invention to provide a means for dependably and accurately detecting variations of a fluid within a sealed container.

A further object is to provide such means operable over a wide range of travel.

A still further object is to provide such means that may be easily serviced and cleaned where necessary, and yet normally requiring but little attention or adjustment.

Another object is to provide an improved magnetic coupling wherein the follower will not lose the driver but reaches a coincident position therewith despite the extent of temporary misalignment.

Other objects and many attendant advantages will be more readily comprehended by those skilled in the art upon a detailed consideration of the following specification and drawings wherein:

FIG. 1 is a side elevational view, partially in section, of one preferred embodiment of the present invention;

FIG. 1a is a plan view of a portion of the structure of FIG. 1;

FIG. 2 is a greatly enlarged view of a portion of FIG. 1 illustrating the magnetic field pattern, and FIGS. 3 and 4 are side elevational views, partially in section, illustrating alternative follower elements.

Referring now to FIG. 1 for a detailed consideration of one preferred embodiment in accordance with the present invention, there is shown a housing 10 for containing the elements and adapted to be suitably supported over and fastened to a metering tube or the like 11 accommodating a fluid (not shown) whose level or other condition is to be continuously determined and indicated by the rotative position of a pointer 12 movable over a horizontally positioned arcuate scale 13.

Within housing 10 is provided an elongated and upright hollow cylindrical container 14 of fluid tight construction having a mouth at its base opening into the tube 11 but being sealed by suitable means from the remainder of housing 10. Projecting into container 14 is a shaft 15 carrying at its upper end a cylindrical bar magnet 16 and having its lower end extending downwardly into fluid tube 11 and connected to a float or other device (not shown) that may ride upwardly or downwardly with changes in the level or other condition of the fluid to be detected.

As thus far described, it is evident that shaft or rod 15 may reciprocally move further into or out of sealed cylinder 14 with variations in the fluid and in so doing positions the permanent magnet driver member 16 upwardly and downwardly in a straight line motion inside of sealed cylinder 14. A suitable stop 17 is also carried by the portion of shaft 15 that extends downwardly into tube 11 to limit the extent of upward travel of the shaft 15, into cylinder 14.

Positioned outside cylinder 14 but proximate thereto is a helically shaped elongated follower member 18 that is supported for rotation, by means of suitable bearings 19 and 20, about an axis 21 parallel to the axis of the cylinder 14 as shown. Follower helix 18 is formed of a thin strip of magnetically sensitive material, such as soft iron or other, and may be carried by a cylinder of non-magnetic material 22 that also carries the above mentioned indicator pointer 12 for rotation therewith by means of a supporting arm 23 transversely connected to its upper shaft 24. The rotation of helix 18 about its axis 21 correspondingly positions pointer 12 over graduated scale 13 thereby to indicate the extent of rotation.

As driver magnet 16 is reciprocally positioned within sealed cylinder 14 in response to changes in the fluid, the magnetic attraction between the magnet and the magnetically sensitive helix follower 18 causes the helix to rotate so that its edge 25 at a longitudinal position corresponding to that of the magnet is closest to the magnet. Since the helix edge 25 is continuously twisted in a regular manner about its longitudinal axis 21, the helix may assume but one and only one different rotative position for each different vertical position of magnet 16. Consequently as magnet 16 is raised or lowered, the freely rotatable helix 18 turns to a different position for each vertical position of the magnet in a manner similar to a rack and pinion gearing arrangement.

As best shown by the enlarged sketch of FIG. 2, the flux lines 26 produced by magnet 16 penetrate helix 18 and travel therethrough in a direction substantially parallel to helix axis 21 for a major portion of their length. As magnet 16 is reciprocally moved alongside the helix, the movement of these lines is also in the direction of their length. This offers many important advantages among which are the reliability and positiveness of the magnetic following action, and the rather wide range of movement of the driver magnet that may be positively followed by the helix. Furthermore it is evident that the elements may be easily and economically made and assembled, and later serviced and cleaned with equal facility.

Considering in a non-rigorous manner the nature of this magnetic coupling to achieve these advantages, the magnetic flux lines 26 may be likened to a series of rubber bands that may be stretched, twisted, or otherwise distorted in a variety of ways, but always seek to regain their initial configuration. These flux lines also obey the well known magnetic rule of always seeking the path of lowest magnetic reluctance, which of course requires in the present invention that they travel for maximum length through the helix. Consequently, should the helix not be in the correct rotative position for a given vertical position of the magnet whereby its edge 25 does not directly confront the magnet, the flux lines passing through the helix will be distorted and will exert a force tending to rotate the helix to its correct position to relieve this distortion. Furthermore, despite the extent of the positional deviation between driver and follower, the parallel arrangement of the elements always insures that flux lines pass through a substantial length of the helix whereby the helix is always rotated to its corrected position and these members may not "lose" magnetic engagement. Moreover, since the path of the magnet is alongside the follower and always equidistant from the axis 21 of the follower, the range of movement of the magnet is limited only by the length of cylinder 14 and that of the helix, both of which may be varied as desired to comply with the requirements of the fluid system.

Most desirably the proportions of the various parts of the system are selected so that the effective portion of the helix is twisted to something less than 90°, for example, 85°. This may be accomplished by adjusting the position of stop 17 so that the range of movement of magnet 16 is limited to a distance during which helix 18 undergoes less than 90° of twist. With this arrangement it is impossible for the magnet and follower arrangements to get out of phase by 180° or 360°.

FIGS. 3 and 4 show alternative constructions for the follower helix in accordance with the present invention. In FIG. 3 the follower is comprised of a drum 27 of non-magnetic material containing a flat strip 28 of iron, steel or other magnetically sensitive material wrapped around the outer surface of the drum 27 to form a helix about its longitudinal axis 29 as shown. In FIG. 4, the follower is also a drum or other cylindrical member 30 but the helix is formed by spiralling two or more wires 31 and 32 of magnetic material about its outer surface and lengthwise of its axis 33. In both modifications the remaining elements of the coupling are the same as in FIG. 1 and bear the same number designations. The mode of operation is also the same since the magnet and follower are positioned for their respective motions along parallel axes, the flux lines are generated in a direction substantially parallel to these axes, and the flux lines are displaced in their lengthwise direction with movement of driver magnet 16, as in FIG. 1.

To incorporate this fluid measuring device in an automatic control system for regulating the fluid within tube 11, it is only necessary to convert the rotative position of helix follower 18 into a pneumatic or electrical signal sufficient to operate a control valve or other mechanism. This may be readily accomplished by supporting a cam or linkage member 34 or the like to helix shaft 24 for rotation therewith as is generally shown in FIG. 1. A suitable pneumatic or electrical transmitter means (not shown) may then provide the necessary output signal by detecting the position of the cam as is known to those skilled in the art.

It is to be particularly noted that the arrangement of the elements and their mode of operation in accordance with the present invention offer many advantages of a constructional nature in addition to the improved magnetic functioning of the coupling. For example, it is noted that only the bar magnet 16 is enclosed within a fluid tight cylinder 14 whereas the helix follower together with its pointer 12 and indicator scale 13 are open to ambient pressures. This arrangement eliminates the need for the usually troublesome fluid tight seal between a follower and indicator as would be necessary if the helix follower rather than the magnet driver were enclosed within a fluid tight cylinder. In addition the magnet driver 16 is of the least complex construction, preferably a simple bar magnet as shown, which reciprocally moves within a hollow cylinder 14 in the manner of a piston-cylinder arrangement. This is to be particularly contrasted with the difficulty and expense of using specially formed fluid tight chambers to accommodate horse shoe styled or other unsymmetrical magnet constructions, as well as the difficulty in positioning and balancing such unsymmetrical magnet elements during movement thereof, while maintaining the spacing between the magnet and follower constant during such motion. Since these and other advantages are embodied in the present invention, this invention is to be considered as being limited only in accordance with the following claims.

I claim:

1. In a fluid measuring system, an elongated cylindrical sealed container in communication with fluid in said system, a magnet member reciprocally movable within said container along its longitudinal axis thereof in response to variations in the fluid to be detected, said magnet member being cylindrical and having a diameter a little less than that of the container, and an elongated follower member of helical configuration rotatably supported about its longitudinal axis outside of said container and proximate to the container wall; the longitudinal axis of said helical member being in parallel alignment with the longitudinal axis of said container whereby said magnet passes flux through said helical follower in a direction parallel to its longitudinal axis and upon reciprocal movement of said magnet within the cylinder, the flux lines are displaced in their lengthwise direction.

2. In a fluid measuring system, a magnet member symmetrically formed about its longitudinal axis and being reciprocally movable along said axis in response to variation in the fluid, an elongated follower member of helical configuration symmetrically formed about its longitudinal axis and being many times longer than said magnet, said follower being supported for rotation along its longitudinal axis and being positioned proximate to and in parallel alignment with said magnet axis, a fluid tight cylinder of non-magnetic material about said magnet and having a diameter a little greater than said magnet, whereby said magnet and follower are isolated from each other by a fluid tight cylinder wall.

3. In a device of the class described, an elongated sealed container connectable to a fluid-containing system, a magnet member reciprocally movable within the container along a given axis in response to variation in fluid in said system, an elongated follower member of helical configuration and of magnetically susceptible material supported for rotation about an axis parallel to said given axis and outside of said container, said magnet being positioned to pass flux longitudinally through said helical member whereby its movement is in a direction lengthwise of its flux lines.

4. In a device of the class described, an elongated sealed container connectable to a fluid-containing system, a magnet member reciprocally movable within the container along a given axis in response to variation of fluid in said system, an elongated follower member of helical configuration and of magnetically susceptible material, said follower being supported for rotation about a fixed axis outside said container and parallel to said given axis, said magnet being positioned to pass flux longitudinally through said helical member whereby its reciprocal movement is in the direction of its flux lines, and an indicator device being engaged by said follower to indicate the rotative position thereof.

5. In a magnetic coupling, a fluid tight container of non-magnetic material, a magnet reciprocally movable along a given axis within said container and in a direction parallel to its flux lines, an elongated follower member supported proximate to but outside said container, said follower being supported for rotation about a fixed axis parallel to said given axis, said follower supporting a helically formed member of magnetically permeable material to form a low reluctance path for said flux.

6. In a magnetic coupling, an elongated follower member comprising a magnetically sensitive helix and being rotatably supported about a given axis, an indicator device connected to said member to indicate the rotative position thereof, and magnet means positioned alongside said follower member and transmitting flux lines longitudinally therethrough in the direction of said axis, said magnet means being reciprocally movable along an axis parallel to said given axis thereby being maintained continually equidistant from said given axis, and a chamber of non-magnetic material enclosing said magnet means to isolate said magnet means from the follower member in a fluid tight manner.

7. A coupling in accordance with claim 6, in which said follower member includes a helically twisted ribbon of magnetically sensitive material.

8. A coupling in accordance with claim 6, in which said follower member includes a cylindrical support of non-magnetic material having a band of magnet material carried thereabout in a helical arrangement.

9. A coupling in accordance with claim 6, in which said follower includes a cylindrical support of non-magnetic material having a plurality of parallel arranged wires of magnetic material carried thereabout in a helical configuration.

References Cited in the file of this patent

UNITED STATES PATENTS

| | | |
|---|---|---|
| 1,040,127 | Bonesteel | Oct. 1, 1912 |
| 2,509,644 | Kinderman | May 30, 1950 |
| 2,634,608 | Sorber | Apr. 14, 1953 |
| 2,850,686 | Macgeorge | Sept. 2, 1958 |

FOREIGN PATENTS

| | | |
|---|---|---|
| 671,854 | France | Sept. 9, 1922 |

OTHER REFERENCES

Publication: "Industrial and Engineering Chemistry," March 1947, page 263. (Copy in Div. 36.)

UNITED STATES PATENT OFFICE

CERTIFICATE OF CORRECTION

Patent No. 3,065,635 November 27, 1962

George D. Keller

It is hereby certified that error appears in the above numbered patent requiring correction and that the said Letters Patent should read as corrected below.

Column 1, line 25, before "follower" insert -- driver and --.

Signed and sealed this 14th day of May 1963.

(SEAL)
Attest:

ERNEST W. SWIDER
Attesting Officer

DAVID L. LADD
Commissioner of Patents